United States Patent
Guttapadu et al.

(10) Patent No.: US 10,881,118 B2
(45) Date of Patent: Jan. 5, 2021

(54) TEA PRODUCT AND PROCESS FOR PREPARING THE SAME

(71) Applicant: Conopco, Inc., Englewood Cliffs, NJ (US)

(72) Inventors: Sreeramulu Guttapadu, Bangalore (IN); Vadivel Govindaswamy, Vellore (IN); Mohamed Sirajudeen Jahabardeen, Thiruvarur (IN); Gurmeet Singh, Bangalore (IN)

(73) Assignee: Conopco, Inc., Englewood Cliffs, NJ (US)

(*) Notice: Subject to any disclaimer, the term of this patent is extended or adjusted under 35 U.S.C. 154(b) by 536 days.

(21) Appl. No.: 15/512,941

(22) PCT Filed: Sep. 14, 2015

(86) PCT No.: PCT/EP2015/070920
§ 371 (c)(1),
(2) Date: Mar. 21, 2017

(87) PCT Pub. No.: WO2016/050489
PCT Pub. Date: Apr. 7, 2016

(65) Prior Publication Data
US 2017/0245517 A1    Aug. 31, 2017

(30) Foreign Application Priority Data
Oct. 1, 2014 (EP) .................... 14187257

(51) Int. Cl.
A23F 3/30 (2006.01)
A23F 3/22 (2006.01)
A23F 3/18 (2006.01)

(52) U.S. Cl.
CPC ............ *A23F 3/30* (2013.01); *A23F 3/18* (2013.01); *A23F 3/225* (2013.01)

(58) Field of Classification Search
None
See application file for complete search history.

(56) References Cited

U.S. PATENT DOCUMENTS

| 6,235,323 | B1* | 5/2001 | Carns ...................... A23F 3/30 426/78 |
| 2003/0032945 | A1 | 2/2003 | Jayaraman |
| 2003/0064130 | A1 | 4/2003 | Blair et al. |
| 2007/0048429 | A1* | 3/2007 | Griffiths ..................... A23F 3/32 426/597 |
| 2008/0118602 | A1 | 5/2008 | Narayanan et al. |
| 2009/0117229 | A1* | 5/2009 | Colliver ..................... A23F 3/08 426/49 |
| 2010/0233322 | A1 | 9/2010 | Fukuda et al. |
| 2010/0297320 | A1 | 11/2010 | Branlard et al. |
| 2012/0021115 | A1 | 1/2012 | Boehm et al. |
| 2012/0058242 | A1* | 3/2012 | Sasame ................... A23F 3/163 426/597 |
| 2012/0263857 | A1* | 10/2012 | Suzuki ...................... A23F 3/14 426/597 |
| 2013/0129873 | A1 | 5/2013 | Cooper et al. |

FOREIGN PATENT DOCUMENTS

| CN | 102293293 | 2/2011 |
| CN | 102170788 | 8/2011 |
| CN | 102548423 | 7/2012 |
| CN | 103082045 | 5/2013 |
| GB | 1329612 | 9/1973 |
| GB | 2461717 | 1/2010 |
| JP | 59042846 | 9/1982 |
| JP | 6296457 | 10/1994 |
| JP | 2005531310 | 10/2005 |
| JP | 2007517510 | 7/2007 |
| JP | 2012029692 | 2/2012 |
| KR | 20080110121 | 12/2008 |
| WO | WO0057713 | 10/2000 |
| WO | WO02069727 | 9/2002 |
| WO | WO2004002235 | 1/2004 |
| WO | WO2010037768 | 4/2010 |
| WO | WO2011047991 | 4/2011 |
| WO | WO2012013519 | 2/2012 |

OTHER PUBLICATIONS

Search Report & Written Opinion in EP14187257, dated Apr. 15, 2015 (NPL 1, pp. 1-4).
Search Report & Written Opinion in PCTEP2015070920, dated Oct. 15, 2015, WO (NPL 1, pp. 5-14).

* cited by examiner

*Primary Examiner* — Anthony J Weier
(74) *Attorney, Agent, or Firm* — Foley & Lardner LLP

(57) ABSTRACT

The present invention relates to a tea product and more particularly the present invention relates to a black tea product. According to the present invention there is provided a process for producing a tea product comprises the steps of: a) extracting a leaf tea product including both a soluble part and an insoluble part with a solvent; b) separating the insoluble part from the soluble part; c) compacting the insoluble part to obtain a base tea material; d) drying the base tea material to a moisture content of less than 5% by weight. e) contacting the soluble part obtained in step (b) with the dried base tea material; f) further drying the mixture to obtain the tea product.

11 Claims, No Drawings

TEA PRODUCT AND PROCESS FOR PREPARING THE SAME

FIELD OF THE INVENTION

The present invention relates to a tea product and more particularly the present invention relates to a black tea product.

BACKGROUND OF THE INVENTION

Tea is one of the most extensively consumed beverages throughout the world. Among different varieties of tea, black leaf tea products are quite popular. Black leaf tea may be brewed and consumed in different ways. The black leaf tea may directly be brewed in hot water or a tea bag containing black leaf tea may be put in hot water for brewing. However the tea is brewed in hot water, we have found that one has to invest sufficient time (at least 2 to 4 minutes) for brewing to obtain a good quality tea beverage.

The quality of black tea beverage especially depends on the strength and the colour of the beverage. A black tea beverage with intense red colour is generally preferred by consumers. The strength of the tea product depends on the amounts of soluble tea solids that are released from the leaf tea product while brewing.

We have also found that even after spending sufficient time (2 to 4 minutes) the leaf tea waste produced after brewing (i.e the spent tea leaves) contain a good amount of tea solids, polyphenols and all the associated tea "goodies". Consumers generally throw this leaf tea waste away after the brewing process.

There is prior art which discloses manufacturing processes for fast infusing tea leaf. US 2003/0064130 (Unilever) disclose a process for manufacturing a fast infusing black leaf tea. The process involves (a) withering tea leaves to a moisture content between 64 and 70 percent, (b) macerating the withered leaves tea leaves by the controlled application of both shear and compression forces sufficient to disrupt the majority of cells within the tea leaf, to introduce morphological changes in the tissue and to redistribute the cell contents, (c) fermentating the resulting dhool, (d) firing the leaves to arrest the fermentation and (e) drying and sorting the fired leaves to give black leaf tea. The black leaf tea shows a rate and degree of infusion typical of CTC teas, while maintaining the appearance of orthodox tea. The black leaf tea is preferably of Broken Orange Pekoe grade or larger if the black leaf tea is intended for direct infusion and of Broken Orange Pekoe and/or Broken orange Pekoe Fannings if the black tea is intended for use in tea bags.

There is also prior art which discloses the production of a black tea product with enhanced red colour.

US2008/0118602 (Unilever) discloses a process for the manufacture of a tea product which is readily infusible and has improved red colour. The process comprises contacting black tea with ascorbic acid and/or its salts, an oxidizing agent and water for a period of at least 5 minutes followed by drying to prepare a tea product that is infusible in water at 5 to 100° C.

Although there is prior art which disclose tea products with faster infusion, improved red colour etc., there is still a need to develop a tea product which is able to produce a tea beverage with enhanced red colour and strength while keeping the brewing time very short and without the addition of any chemical substance (e.g. ascorbic acid). Furthermore a tea product which reduces the wastage of tea "goodies" is also desired.

OBJECTS OF THE INVENTION

It is therefore an object of the present invention to overcome or ameliorate at least one of the disadvantages of the prior art, or to provide a useful alternative.

It is another object of the present invention to provide a fast infusible tea product with enhanced red colour.

It is yet an object of the present invention to provide a tea product which is able to produce a tea beverage with enhanced red colour and strength while keeping the brewing time very short and without the addition of any chemical substance (e.g. ascorbic acid).

It is a further object of the present invention to reduce the wastage of tea "goodies" yet provide a faster infusion with enhanced red colour.

The present inventors have surprisingly found that a process wherein the soluble tea solids are added on a base tea material with some particular characteristics is able to provide a tea product which minimizes the waste of tea soluble solids and provides a faster infusion with enhanced red colour.

SUMMARY OF THE INVENTION

In a first aspect the present invention provides a process for producing a tea product comprising the steps of:
  a) extracting a leaf tea product comprising both a soluble part and an insoluble part with a solvent;
  b) separating the insoluble part from the soluble part;
  c) compacting the insoluble part to obtain a base tea material;
  d) drying the base tea material to a moisture content of less than 5% by weight.
  e) contacting the soluble part obtained in step (b) with the dried base tea material;
  f) further drying the mixture to obtain the tea product.

In a second aspect the present invention provides a tea product comprising:
  a) 5 to 95% by weight of a base tea material which has a porosity of less than 5 cc/kg and which comprises less than 5% of polyphenols by dry weight; and
  b) 95 to 5% by weight of soluble tea solids loaded on the base tea material, wherein the soluble tea solids comprise 10 to 40% of polyphenols by dry weight.

Any feature of one aspect of the present invention may be utilized in any other aspect of the invention. The word "comprising" is intended to mean "including" but not necessarily "consisting of" or "composed of." In other words, the listed steps or options need not be exhaustive. Except in the operating and comparative examples, or where otherwise explicitly indicated, all numbers in this description indicating amounts of material or conditions of reaction, physical properties of materials and/or use are to be understood as modified by the word "about". Numerical ranges expressed in the format "from x to y" are understood to include x and y. When for a specific feature multiple preferred ranges are described in the format "from x to y", it is understood that all ranges combining the different endpoints are also contemplated.

DETAILED DESCRIPTION OF THE INVENTION

The Process of the Invention:

Leaf tea product preferably means a finished tea product with moisture content less than 5%. The fresh tea leaf may preferably be obtained from *Camellia sinensis* var. *sinensis* and/or *Camellia sinensis* var. *assamica*. Fresh tea leaves refers to tea leaves and/or stem that have never been dried to a water content of less than 30% by weight, and usually have a water content in the range 60 to 90%.

Leaf tea product preferably is a black tea product. The black leaf tea product may be obtained directly from the market or may be manufactured in the tea plantation using the usual procedure for manufacturing black tea which includes the steps of withering, maceration, fermentation and drying.

Leaf tea product contains some materials which are soluble in a solvent most preferably water (either hot or cold) which includes polyphenols. This soluble part may also be referred as soluble tea solids. Leaf tea product also contains some material which is insoluble e.g. the leaf matrix. The materials which are soluble on extraction are mentioned herein as "soluble part" and the materials which are not soluble are mentioned herein as "insoluble part".

In the first step, the leaf tea product undergoes extraction. This is a process in which a solvent is used to extract sufficient amount of the soluble matter present in the tea product. The most preferred solvent used for this purpose is water. Preferably the water is hot and has a temperature in the range of 80 to 100° C. The extraction may also preferably be carried out simply by boiling the leaf tea product in water for about 2 minutes to 2 hours, preferably 5 minutes to 1 hour. The extraction may also be carried out by a co-current or counter-current extractor.

After the extraction step, the insoluble part is separated from the soluble part. This separation may be achieved by any known separation process. The most preferred separation process is centrifugation. The insoluble part mostly contains the leafy material (leaf matrix) produced after the extraction.

After the separation of the insoluble part from the soluble part, the insoluble part undergoes compaction to obtain a base tea material. The tea material that is obtained after the stage of compaction is described herein as a "base tea material". This step may preferably be carried out by any known method used for compaction.

Some of the non-limiting examples of preferred methods of compaction are: (a) by using single screw extrusion or twin screw extrusion (b) by passing the material through a perforated plate in a cylinder with press wherein the pressure varies from 0 to 10 bar, preferably 0 to 8 bar and most preferably 0 to 5 bar.

The purpose of doing this step is to reduce the porosity of the base tea material. In the case of present invention porosity represents the measurement of the void (i.e., "empty") spaces in the tea material, and is a fraction of the volume of voids over the total weight of the tea material which can preferably be represented by cc/g or cc/kg.

The porosity of the base tea material is preferably less than 5 cc/kg, more preferably less than 4 cc/kg and further more preferably less than 3 cc/kg.

The polyphenols content in the base tea material is preferably less than 5%, more preferably less than 4% and most preferably less than 3% by dry weight.

The base tea material is also characterized by its bulk density. In case of the present invention, bulk density represents the mass of the tea material divided by the total volume said tea material occupy. The total volume includes particle volume, inter-particle void volume, and internal pore volume.

The bulk density of the base tea material is preferably at least 350 g/L, more preferably at least 375 g/L, further more preferably at least 400 g/L and most preferably at least 410 g/L.

The base tea material is also characterized by its hydration capacity. In case of the present invention, hydration capacity represents the ability of the specified quantity of the tea material to absorb certain amount of water.

The hydration capacity of the base tea material is preferably less than 55 mL/100 g, more preferably less than 50 mL/100 g.

Tea Product of the Invention:

The tea product preferably comprises 10 to 90%, more preferably 20 to 75% further more preferably 35 to 70% and most preferably 50 to 65% of the base tea material by weight. The tea product also preferably comprises 10 to 90%, more preferably 25 to 80% further more preferably 30 to 65% and most preferably 35 to 50% by weight of soluble tea solids. Soluble tea solids refer to tea solids that are soluble in water (hot or cold). The soluble tea solids may be prepared by extracting tea leaf using water as a solvent.

The soluble solids are loaded on the base tea material. This may preferably be achieved by uniformly mixing the soluble tea solids and the base tea material. Any other methods of loading e.g. coating are also within the scope of the present invention.

The soluble solids of the tea product of the present invention, preferably comprises 0.1 to 5%, more preferably 0.5 to 5% and most preferably 1 to 5% by weight of theaflavins.

The soluble solids of the tea product of the present invention, preferably comprises 1 to 20%, more preferably 3 to 20% by weight of catechins.

The soluble solids of the tea product of the present invention, preferably comprises 0.5 to 10%, more preferably 1 to 10%, most preferably 2 to 10% by weight of theanine.

The soluble solids of the tea product of the present invention, preferably comprises 4 to 40%, more preferably 6 to 40% and most preferably 10 to 40% of caffeine by weight.

Now the invention will be demonstrated in terms of examples. The following examples are just for illustration and in no way limit the scope of the present invention.

EXAMPLES

Preparation of the Tea Products

Example A

A black leaf tea product was prepared by taking fresh tea leaf from South Indian tea plantation (Devershola plantation). Fresh tea leaves were first withered for about 18 hours by exposing the leaves to open atmosphere (at about 25° C.). After that the leaves were macerated 4 times using a CTC press. After maceration the leaves were kept in open atmosphere for 90 minutes at a temperature about 25° C. for fermentation. After that the leaves were dried using fluidized bed dryer at 110° C. for 20 minutes. The final moisture content of black leaf tea product was about 3%.

The black leaf tea product of example A was used to make the tea product of the following examples:

1 kg of the black leaf tea product of example A was extracted with 10 L of distilled water at 90° C. for about 15 minutes. After extraction, the insoluble part was separated by filtration (using a muslin cloth). The soluble part (liquid part) was taken and concentrated by using a rotary evaporator at a temperature of 90° C. and vacuum of 300 mm Hg for 15 minutes, to reach 50% concentration of solids.

Three different batches (1 kg each) were processed in the above manner to produce tea products of examples B, C and 1.

Example B

The insoluble part as obtained above from the first batch was dried in a hot air oven at 100° C. for 1 hour. Then the concentrated soluble solids were mixed with the dried insoluble part (dry weight ratio of soluble part to insoluble part 1:1.5). The final material was dried at a temperature of 100° C. in a hot air for 30 minutes to get final moisture of 3%.

Example C

The concentrated soluble solids as obtained above from the second batch was mixed with the insoluble part (dry weight ratio of soluble part to insoluble part 1:1.5) and the mixture was then compacted by passing through a co-rotating twin screw extruder (Model: Omicron 12, Die size 1 mm) at a pressure of 2 bar with a speed of 350 rpm. After that, the extruded material was dried at a temperature of 100° C. in a hot air oven for 60 minutes to get the final product moisture content of 3%. The final dried extruded material was chopped into small pieces with a length of about 5 mm using a cutter.

Example 1

For the third batch, the insoluble part was compacted by passing through a co-rotating twin screw extruder (Model: Omicron 12, Die size 1 mm) at a pressure of 2 bar and speed of 350 rpm to obtain a base tea material. After that, the base tea material was dried at a temperature of 100° C. in a hot air oven for 60 minutes to get the final product moisture of 3%. The final dried extruded material was chopped into small pieces of length about 5 mm using a cutter. After that the concentrated soluble solids were added to this compacted material (length of 5 mm, diameter of 1 mm) followed by drying the mixture again at a temperature of 100° C. in a hot air for 30 minutes to get final moisture of 3%.

Characterization of the Base Tea Material as Disclosed Above in the Example 1:

Hydration:

2 g of the base tea material was taken in 100 mL water (25° C.) and allowed to stay for 10 minutes in that water. Subsequently the base tea material was filtered using Whatman 541 filter paper by applying vacuum of 300 mm Hg for 30 seconds. The moisture content of the tea particles was measured using a digital moisture balance with an IR heater at a temperature of 130° C.

Hydration capacity of the base tea material as measured using the above procedure was found to be: 47.5%.

Bulk Density:

Bulk density of tea was measured by dividing the mass (in grams) of the base tea by the volume (L) occupied by a given amount of base tea material. About 50 g of base tea material was filled in a measuring cylinder, then it was tapped for 10 times to get uniform packing and the volume occupied was taken for the calculation.

Bulk density of the base tea material as measured using the above procedure was found to be: 415 g/L.

Porosity:

Porosity was measured by standard method (ASTMD6556).

Porosity of the base tea material as measured using the above procedure was found to be: 3.1 cc/kg.

Infusions were made from the tea products as prepared above following the two different protocols as follows:

Tea Bag Protocol:

2 g tea was placed in a tea bag (double chamber) and sealed. Tea bag was brewed (by keeping the tea bag in hot water) in 300 mL of hot water (at a temperature of about 95° C.) for 30 sec and given 3 dips at the end.

Another set was prepared wherein the brewing time was 2 minutes using the same protocol.

Direct Brewing Protocol:

2 g tea was directly added in 100 mL of hot water (at about 95° C.) followed by brewing it for 30 seconds. At the end of brewing time, one stir was given with a spoon and the infusion was strained.

Another set was prepared wherein the brewing time was 2 minutes using the same protocol.

The tea infusions (of examples A, B, C and 1) were then subjected to the following measurements viz. colour and total soluble solids (TSS) delivered at the end-cup (in infusion):

Measurement of Colour:

The Infusions were used for the colour measurement. Colour (CIE L*a*b* values) was measured using a Hunter lab Ultrascan XE. A halogen cycle lamp was used as the light source. The illuminant used was D65 and the measurements were made at 10°-Observer angle. Measurements were made using a quartz cuvette of 10 mm path length. Tea infusion was filled up to the brim in the cuvette and placed in the instrument for color measurement. The instrument was calibrated using a standard white tile (Hunterlab Duffuse/8°, mode—RSEX, Port-1" and area—large) in accordance with the instructions provided in the instructions manual. The L*a*b* values were measured at room temperature (~25° C.). Positive a* is red and negative a* is green. Generally for black tea product the a* value is positive. The higher the a* value the redder the infusions are. Black tea products are characterized by their reddish infusion colour.

Measurement of Total Soluble Solids (TSS):

The total soluble solids content was measured using (ISO9768:1994 (E)). A dry pan was placed in a hot air oven at 110° C. for 2 hours. The pan was then placed in a dessicator for weighing. 2 g of black tea was placed in a paper cup, 100 mL of water at 100° C. was added and the infusion was stirred for 2 minutes. The infusion was then filtered using Whatman 541 filter paper. The filtrate was collected in a beaker and the volume made up 100 mL with deionized water. The 100 ml of hot tea liquor was put in the weighed pan and placed on a water bath at 90-100° C. After the water in the infusion had completely evaporated, the bottom of the pan was wiped with a clean cloth to remove any remaining water. The pan was then placed in a hot air oven for drying for 12 hrs at 110° C. The final weight of the pan was taken and the initial weight was subtracted to obtain the amount of soluble solids in the infusion.

The results of the experiments are summarized in the following Table 1:

TABLE 1

| | Protocol | | | | | | | |
|---|---|---|---|---|---|---|---|---|
| | Tea Bag | | | | Direct Brewing | | | |
| | Brewing Time | | | | | | | |
| | 30 seconds | | 2 minutes | | 30 seconds | | 2 minutes | |
| | Measured Parameters | | | | | | | |
| | a* | TSS** | a* | TSS** | a* | TSS** | a* | TSS** |
| Example A | 0.2 | 158 | 1.3 | 220 | 4.7 | 124 | 11.9 | 164 |
| Example B | 1.7 | 174 | 3.5 | 311 | 19.9 | 229 | 14.8 | 269 |
| Example C | 1.0 | 179 | 1.9 | 195 | 9.8 | 179 | 15.1 | 278 |
| Example 1 | 17.9 | 614 | 20.3 | 743 | 36.7 | 614 | 37.13 | 638 |

**TSS was measured as mg/100 mL.

From the above table it is evident that tea product as prepared according to the present invention (Example 1) provides an infusion which is far superior in terms of a* (redness) value and TSS when compared with control examples (A, B and C). The infusions of example 1 are having richer red color and much higher soluble solids delivery at the end-cup when compared with the control examples. It is also clearly visible (from both the protocols) that the tea product of the present invention is able to provide a tea infusion with better characteristics only in 30 seconds, thereby providing a faster infusion. It is therefore evident from the description and the examples that the present invention is able to provide a fast infusible tea product with enhanced red colour and also with enhanced strength (high amount of delivered soluble solids).

The invention claimed is:

1. A tea product comprising:
   a) 5 to 95% by weight of a base tea material which is porous and has a porosity of less than 5 cc/kg and which comprises less than 5% of polyphenols by dry weight; and
   b) wherein the base tea material comprises a coating of 95 to 5% by weight of soluble tea solids, and wherein the soluble tea solids comprise 10 to 40% of polyphenols by dry weight.

2. The tea product as claimed in claim 1 wherein the soluble solids comprise 0.1 to 5% by weight of theaflavins.

3. The tea product as claimed in claim 1 wherein the soluble solids comprise 1 to 20% by weight of catechins.

4. The tea product as claimed in claim 1 wherein the soluble solids comprise 0.5 to 10% by weight of theanine.

5. The tea product as claimed in claim 1 wherein the soluble solids comprise 4 to 40% by weight of caffeine.

6. A process for producing the tea product as claimed in claim 1 comprising:
   a) extracting a leaf tea product comprising both a soluble part and an insoluble part with a solvent;
   b) separating the insoluble part from the soluble part;
   c) compacting the insoluble part to obtain a base tea material to provide a porosity of less than 5 cc/kg;
   d) drying the base tea material to a moisture content of less than 5% by weight;
   e) contacting the soluble part obtained in step (b) with the dried base tea material;
   f) further drying the mixture to obtain the tea product.

7. The process as claimed in claim 6 wherein the solvent is water.

8. The process as claimed in claim 6 wherein the porosity of the base tea material is less than 5 cc/kg.

9. The process as claimed in claim 6 wherein the polyphenols content in the base tea material is less than 5% by dry weight of the base tea material.

10. The process as claimed in claim 6 wherein bulk density of the base tea material is at least 350 g/L.

11. The process as claimed in claim 6 wherein the hydration capacity of the base tea material is less than 50 mL/100 g.

* * * * *